United States Patent [19]

Pioch

[11] 4,276,675

[45] Jul. 7, 1981

[54] AUXILIARY HANDLE FOR A POWER TOOL

[75] Inventor: Peter P. Pioch, Idstein, Fed. Rep. of Germany

[73] Assignee: Black & Decker Inc., Newark, Del.

[21] Appl. No.: 119,560

[22] Filed: Feb. 7, 1980

[51] Int. Cl.³ .......................... A47B 95/02; E05B 1/00
[52] U.S. Cl. ................................... 16/111 R; 403/90; 403/234
[58] Field of Search ............. 16/110 R, 111 R, 114 R; 403/234, 233, 236, 235, 237, 191, 90

[56] References Cited

U.S. PATENT DOCUMENTS

| | | |
|---|---|---|
| 1,468,659 | 9/1923 | Cohen . |
| 1,770,721 | 7/1930 | Willis .................................. 403/90 X |
| 1,928,082 | 9/1933 | Vigne .................................. 16/110 R |
| 2,545,659 | 3/1951 | Ginter ................................. 16/110 R |
| 3,537,336 | 11/1970 | Schmuck . |

FOREIGN PATENT DOCUMENTS 22472  5/1935  Australia ................................... 403/90
2801828  7/1979  Fed. Rep. of Germany .

Primary Examiner—Andrew V. Kundrat
Attorney, Agent, or Firm—Walter Ottesen; Leonard Bloom; Edward D. Murphy

[57] ABSTRACT

An auxiliary handle for a power tool having an elongated housing of the type which is clampingly attachable to the housing of the tool near the forward end thereof. The handle includes a pair of clamping jaws which cooperate with a hand grasp to generate a clamping force which is transmitted to a split collar retained between the jaws which in turn is adapted to receive and clampingly engage a cylindrical barrel portion of the housing. The collar has a convex outer surface which defines a spherical zone, enabling the collar to be retained in a complimentary shaped annular concave recess defined by the jaws, while allowing the jaws and the hand grasp to be moved in any direction along the spherical zone to thereby position the hand grasp angularly in three dimensions relative to the housing.

8 Claims, 4 Drawing Figures

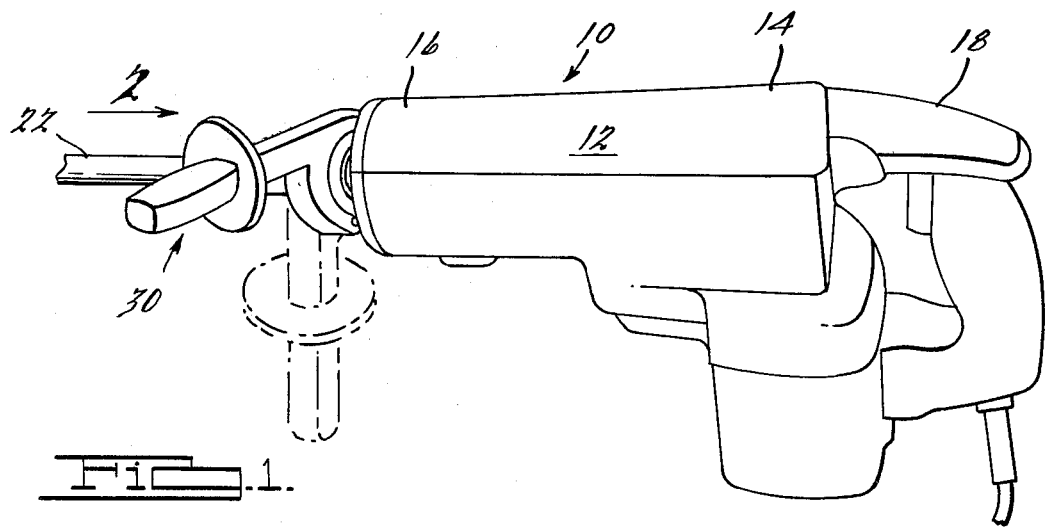
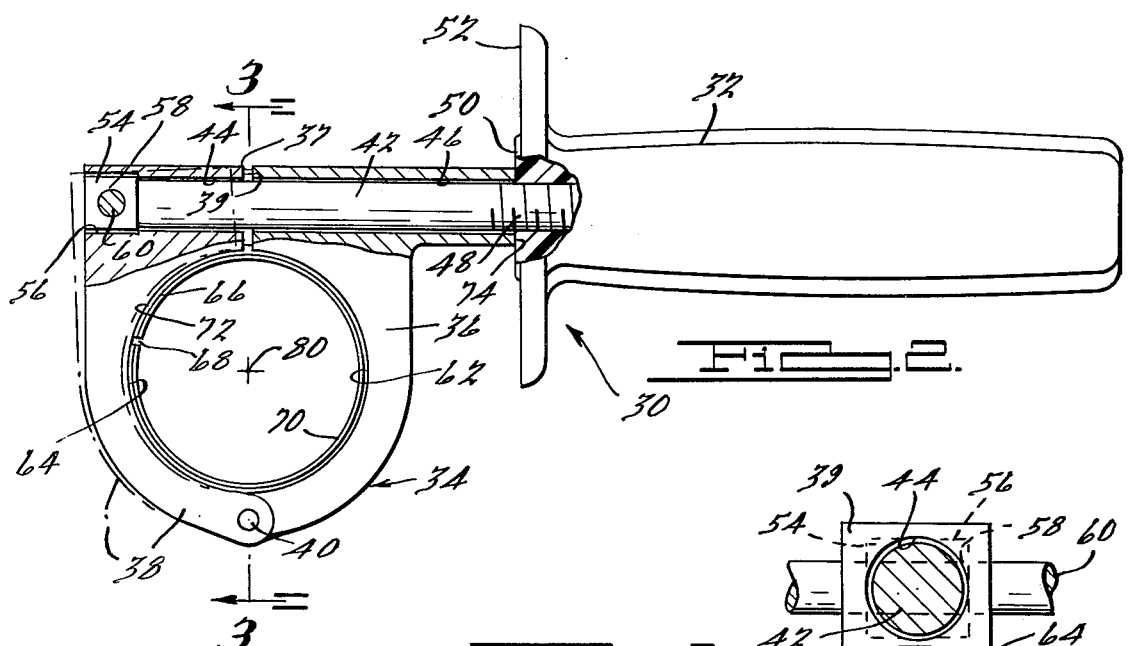
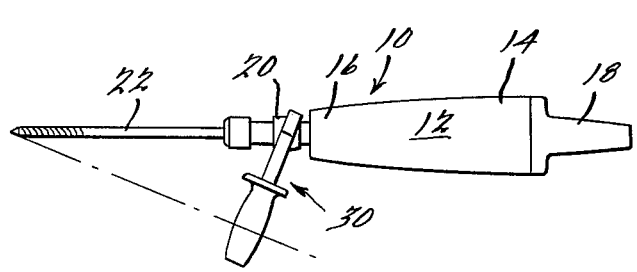
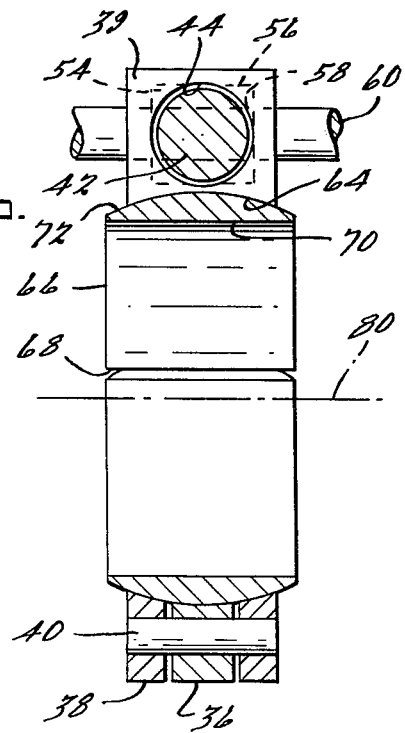

AUXILIARY HANDLE FOR A POWER TOOL

BACKGROUND AND SUMMARY OF THE INVENTION

The present invention relates to portable power tools and in particular to a novel auxiliary handle for supporting the forward end of a power tool having an elongated housing.

As is well known, various portable power tools comprise a relatively elongated housing in which the mass of the tool driving means is distributed. The mass distribution of such power tools contributes to a center of gravity which is located at a distance from the standard rearwardly located handle of such a tool and results in a relatively large moment relative to the handle. This fact results in a tool which is often awkward and difficult to control by way of a single handle situated at the rearward portion of the housing of the tool. This controllability problem is important in applications where it is necessary to keep the drill bit of such a power tool in a substantially perpendicular orientation relative to a working surface. This problem is particularly acute with power tools such as rotary hammers or hammer drills wherein the tool is adapted to impart both axial and torsional loads to a drill bit designed to perform work on relatively hard working surfaces.

In attempts to alleviate the above noted problems and contribute to a more controllable power tool, various auxiliary handles have been provided at or near the forward section of the elongated tool housing to allow the operator to support the power tool at a second point thereon. Additionally, such handles have typically included means allowing them to be rotated within a plane normal to the axis defined by the tool bit. Such a feature allows power tools equipped with such a forward auxiliary handle to be utilized in various environments while additionally providing the operator with a limited degree of freedom in orienting the handle to his liking.

However, prior auxiliary power tool handles of the above-described type possess certain limitations which do not totally resolve the problems associated with such tools. More specifically, such auxiliary tool handles are rotatable only in a single plane situated perpendicularly of the axis defined by the drill bit of such a tool. A user of such a handle is therefore limited in his choice of handle positions. This situation may restrict the use of such an auxiliary handle in certain limited space applications. Moreover, the load placed upon the tool by a user through such an auxiliary handle creates a moment about the drill bit axis which introduces additional problems in controlling the point of contact of the drill bit with a work surface as well as the orientation of the entire tool during a drilling or hammering operation. Therefore, such prior known auxiliary handles do not totally resolve the controllability problems associated with the use of portable power tools having elongated housings.

It is, therefore, desirable to provide an auxiliary power tool handle which reduces the moment about the axis of the drill bit of a power tool created by exerting a forwardly directed force upon the handle parallel to the axis of the drill bit. It is further desirable to provide such an auxiliary handle which is readily positionable in more than one plane to allow the load placed upon the handle to be directed as desired and the handle to be utilized more readily in limited space situations. Moreover, it is desirable to provide such a handle which is of a simple construction, is convenient to use, and is easily attachable and positionable relative to the housing of a power tool.

The auxiliary handle according to the present invention is positionable in three dimensions relative to the axis of the drill bit extending forwardly of the tool housing. The handle includes a pair of clamping jaws which defines a concave annular recess in which a complimentary shaped annular split collar is carried. The collar defines an inner surface which is cylindrical and an outer surface which is convex in shape so as to define the zone of a sphere. The collar is adapted to receive and engage a cylindrical barrel portion of the tool housing and may be clamped or secured thereto through the imposition of a clamping force generated by a threaded stud which is affixed to and rotatable with the handle. This novel auxiliary handle arrangement allows the handle to be rotated 360° about the axis of the drill bit, as well as pivoted both longitudinally and transversely relative to the drill bit by moving the clamping jaw/handle combination about the annular collar prior to the imposition of a clamping force thereto. As such, the present invention provides a user with a more versatile auxiliary grip for a power tool, as well as a secondary support for the tool which minimizes the moment generated by loads placed upon the handle by the user.

BRIEF DESCRIPTION OF THE DRAWINGS

FIG. 1 is a perspective view of a portable power tool in combination with an embodiment of an auxiliary handle in accordance with the present invention.

FIG. 2 is an end elevational view, partially in section, of the invention, taken in the direction of arrow 2 in FIG. 1.

FIG. 3 is a sectional view of a portion of the auxiliary handle assembly shown in FIG. 2, taken in the direction of line 3—3 of FIG. 2.

FIG. 4 is a plan view of a power tool/auxiliary handle combination in accordance with the present invention.

DETAILED DESCRIPTION OF THE PREFERRED EMBODIMENT

Referring now more specifically to the drawings, a conventional portable power tool is indicated generally by reference numeral 10. The power tool 10 includes a generally elongated housing 12 which defines a rearward end 14 and a forward end 16. Associated with housing 12 is a gripping handle assembly 18 situated adjacent the rearward end 14 of the housing 12. As shown in FIG. 4, housing 12 also includes a generally cylindrical longitudinally aligned barrel portion 20 situated adjacent the forward end 16 of housing 12. The power tool 10 is provided with a drill bit assembly 22 extending forwardly from the housing 12.

Shown in combination with the power tool 10 is an embodiment of an improved auxiliary power tool handle in accordance with the present invention, shown generally at 30. The auxiliary handle 30 includes a gripping member 32 which is adapted to interact with a handle clamping means 34 to facilitate attachment of the auxiliary handle 30 to barrel portion 20 of the housing 12 as more fully described hereinafter. Clamping means 34 is comprised generally of a pair of clamping jaws 36 and 38 respectively. Clamping jaws 36 and 38 are pivotably connected one to another by way of a pivot pin assembly 40. The pivotable feature of the jaws is illustrated in FIG. 2 wherein clamping jaw 38 is shown in phantom in a pivoted position relative to clamping jaw 36. As shown in FIG. 2, clamping jaws 36 and 38 are generally arcuate in shape with each jaw comprising a radially extending end face, 37 and 39 respectively, which are adapted to abut one another when clamping jaws 36 and 38 are pivoted into the closed position.

As illustrated in FIGS. 2 and 3, the auxiliary handle 30 of the present invention also includes an elongated stud member 42 which is adapted to be received within a pair of cylindrical bores 44 and 46 extending through clamping jaws, 38 and 36 respectively, perpendicularly to end faces 37 and 39. As shown in FIG. 2, when clamping jaws 36 and 38 are pivoted into the closed position, bores 44 and 46 are aligned axially with one another so as to create a single cylindrical passage extending through clamping means 34 and through which stud member 42 may be inserted. Stud member 42 is of a sufficient length to extend through this cylindrical passage and is provided with a threaded portion 48 at one end thereof which is adapted to be threaded into a complimentary threaded bore formed in the radially extending flange 52 provided at one end of gripping member 32. The opposite end of stud member 42 is provided with an enlarged square head portion 54 which is received within a complimentary shaped recess 56 axially aligned with bore 44 of clamping jaw 38. As is readily apparent, head portion 54 allows stud member 42 to be non-rotatably retained within the cylindrical passage of clamping means 34. The end face 74 of clamping jaw 36 is adapted to abut a slightly raised pressure pad area 50 on the surface of flange 52 surrounding the threaded bore formed therein. In this manner, stud member 42 exerts a compression force to be applied to clamping means 34 as gripping member 32 is rotated to thread member 32 onto threaded portion 48 of stud member 42 and clamp jaw 36 and 38 together. As so constructed, the auxiliary handle combination may be utilized to retain a standard depth rod 60 in a transversely extending cylindrical bore 58 in square head portion 54 of stud member 42. As such means of retaining a depth rod are well known, they will not be further described herein.

Auxiliary handle 30 is also provided with novel means for positioning the handle 30 relative to the barrel portion 20 of housing 12, as well as drill bit assembly 22 of the power tool 10. The clamping jaws 36 and 38 are provided with arcuate-shaped concave clamping surfaces, 62 and 64 respectively, which cooperate to define a generally annular concave recess when clamping jaws 36 and 38 are pivoted into the closed position shown in FIG. 2. The clamping surfaces 62 and 64 of jaws 36 and 38 are adapted to receive a complimentary shaped annular collar portion 66 having an inner cylindrical bore 70 for receiving the barrel portion 20 of housing 12. In contrast to inner surface 70, outer surface 72 of collar portion 66 is generally convex in shape, thereby defining the zone of a sphere. Collar portion 66 has a radial split 68 formed therein so that the effective diameter of bore 70 is reduced when collar 66 is compressed between clamping jaws 36 and 38 as the previously described clamping force is imparted thereto.

Thus, to utilize the auxiliary handle 30 of the present invention, the operator simply orients the handle 30 in the desired position with the clamping means 34 and collar portion 66 in an uncompressed condition. The auxiliary handle 30 is thereafter clamped to the barrel position 20 of the tool 12 by rotating gripping member 32 which compresses clamping jaws 36 and 38 together to thereby compress collar portion 66 causing it to grip barrel portion 20.

As is readily apparent from the above description, the auxiliary handle 30 of the present invention can be moved in any direction about the spherical zone defined by the outer surface 72 of collar portion 66 prior to the imposition of a clamp force thereto. This feature allows the auxiliary handle 30 to be pivoted both longitudinally and transversely relative to the axis 80 defined by barrel portion 20 and/or drill bit assembly 22, as well as being rotatable 360° about axis 80 as with conventional auxiliary handles. The novel auxiliary handle 30 of the present invention thereby enables gripping member 32 to be positioned in three dimensions relative to the barrel portion 20 and drill bit assembly 22, allowing a user to position gripping member 32 in a multitude of directions relative to the housing 12 of the power tool 10 prior to clamping the auxiliary handle 30 thereto.

The positioning means utilized in the auxiliary handle of the present invention therefore provides a power tool user with a more versatile auxiliary handle assembly which may be situated relative to the housing 12 of the power tool 10 according to the desires of a user. Moreover, the three dimensional positioning feature presents a user with an improved auxiliary handle which overcomes the limitations of other known auxiliary handles by contributing to a more comfortable and controllable power tool-auxiliary handle orientation. More specifically, the invention enables a user to have more control over the direction of the thrust loads applied to the power tool 10 through gripping member 32. Indeed, as shown in FIG. 4, the invention enables a user to direct the thrust load so that it intersects the point of contact of drill bit assembly 22 with a work surface. Positioning the handle 30 in this manner precludes an operator from applying a side load to the tool which could cause the drill bit to wander from the desired contact point on the work surface or result in an undesired angular hole. The invention therefore presents a user with a more comfortable and less fatiguing power tool/auxiliary handle orientation since the auxiliary handle 30 obviates the need to exert an additional force on the power tool 10 to maintain the drill bit assembly 22 in a position perpendicular to a work surface. This consideration is especially important when the auxiliary handle 30 is utilized in association with heavier and more powerful tools such as a rotary hammer or a hammer drill which impart reciprocatory movement to the drill bit assembly.

In connection with the above description of the preferred embodiment, it should be noted that the invention is not limited to the collar portion 66 specifically illustrated in FIG. 3. Rather the concept of the invention includes the provision of a collar portion having an outer surface defining a greater surface area than shown in the drawings, thereby allowing the auxiliary handle 30 to be rotated through larger angles than shown in the drawings.

It is understood that the foregoing description is that of the preferred embodiment of the invention and that various changes and modifications may be made without departing from the spirit and scope of the invention, as defined in the appended claims.

What is claimed is:

1. In a power tool having a generally elongated housing and an auxiliary handle for supporting the forward end of said tool, the improvement comprising:

clamping means for securing said auxiliary handle to the forward end of said tool so that the angular position of said handle relative to the longitudinal axis of said tool is adjustable through three dimensions, including an inner member positioned around and adapted to be compressible on the forward end of the tool and having a substantially spherically contoured outer surface, an outer clamping member connected to said handle and having an inner clamping surface complimentary to said outer surface thereby permitting said outer clamping member to be moved about the spherical zone defined by said outer surface, and means operative on said outer clamping member to apply a clamping force on said inner member to compress said inner member causing it to grip the forward end of said tool.

2. The power tool of claim 1 wherein said inner member comprises a split collar having a cylindrical inner surface for receiving the forward end of said tool and a convex outer surface adapted to be received within said clamping member.

3. The power tool of claim 2 wherein said clamping member is operative to apply a clamping force to said split collar which is effective to reduce the inside diameter of said collar and thereby secure said collar to the forward end of said tool.

4. The power tool of claim 3 wherein said auxiliary handle includes a hand grasp that is connected to said clamping member and operative to coact with said clamping member to produce said clamping force.

5. In a power tool having a generally elongated housing and an auxiliary handle for supporting the forward end of said tool, the improvement comprising:

position adjustment means for adjustably securing said handle to said tool so that the angular position of said handle is adjustable through three dimensions, including a split collar member having a generally convex outer surface substantially defining the zone of a sphere and a generally cylindrical inner surface for receiving the forward end of said tool, and clamping means connected to said handle and having a concave inner clamping surface complimentary to said convex outer surface for receiving said collar member, said clamping means being operative to apply a clamping force to said collar member that is effective to clamp said split collar member to the forward end of said tool.

6. The power tool of claim 5 wherein said split collar member has a generally cylindrical inside surface for receiving the forward end of said tool and said clamping force is operative to reduce the effective inside diameter of said collar member.

7. The power tool of claim 6 wherein said auxiliary handle includes a hand grasp that is adapted to coact with said clamping means to produce said clamping force.

8. For a power tool having a generally elongated housing including a cylindrical barrel portion near the forward end of the housing, an auxiliary handle for supporting the forward end of said tool comprising:

a split collar member having a generally cylindrical inner surface for receiving said barrel portion and a generally convex outer surface substantially defining the zone of a sphere, a pair of clamping jaws pivotably connected to one another having complimentary shaped concave clamping surfaces for receiving said collar member, and a hand grasp associated with said clamping jaws which when twisted coacts with said clamping jaws to generate a clamping force that is applied to said collar member to reduce the effective diameter of said inner surface to thereby clamp said auxiliary handle to said barrel portion.

* * * * *